(12) United States Patent
Yoshida et al.

(10) Patent No.: US 6,197,907 B1
(45) Date of Patent: Mar. 6, 2001

(54) POLYMER OBTAINED BY EMULSION POLYMERIZATION METHOD

(75) Inventors: Eiichi Yoshida, Mitaka; Manabu Ogawa, Hiratsuka; Hiroshi Masuda, Sano; Hiroshi Serizawa, Kazo, all of (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/284,016

(22) PCT Filed: Oct. 11, 1996

(86) PCT No.: PCT/JP96/02941

§ 371 Date: Apr. 6, 1999

§ 102(e) Date: Apr. 6, 1999

(87) PCT Pub. No.: WO98/16561

PCT Pub. Date: Apr. 23, 1998

(51) Int. Cl.[7] .................................................. C08F 118/02
(52) U.S. Cl. ................... 526/319; 526/307.2; 526/318.3; 526/320; 526/321; 526/328; 526/346
(58) Field of Search ............................. 526/307.2, 318.3, 526/319, 320, 321, 328, 346

(56) References Cited

U.S. PATENT DOCUMENTS

| 5,258,466 | * | 11/1993 | Sackmann et al. | ................... 525/282 |
| 5,268,431 | * | 12/1993 | Burroway et al. | ................. 525/333.8 |

FOREIGN PATENT DOCUMENTS

| 5869206 | 4/1983 | (JP) . |
| 61-118404 | 6/1986 | (JP) . |
| 63-272606 | 11/1988 | (JP) . |
| 6416811 | 1/1989 | (JP) . |
| 3111405 | 5/1991 | (JP) . |
| 4208861 | 7/1992 | (JP) . |
| 6116169 | 4/1994 | (JP) . |
| 7216025 | 8/1995 | (JP) . |
| 859736 | 3/1996 | (JP) . |
| 8188604 | 7/1996 | (JP) . |
| 8188622 | 7/1996 | (JP) . |
| WO 98/50436 | * 11/1998 | (WO) . |

* cited by examiner

*Primary Examiner*—Helen L. Pezzuto

(57) ABSTRACT

A polymer of a low molecular weight having a very little odor is produced by emulsion-polymerizing a radical-polymerizable unsaturated monomer at a temperature of 115° C. or higher in the presence or absence of a chain transfer agent.

16 Claims, No Drawings

POLYMER OBTAINED BY EMULSION POLYMERIZATION METHOD

CROSS-REFERENCE TO RELATED APPLICATION

This application is the national phase of International PCT application PCT/JP96/02941, filed Oct. 11, 1996.

TECHNICAL FIELD

The present invention relates to a polymer of a low molecular weight obtained by an emulsion polymerization method, more specifically to a polymer of a low odor and a low molecular weight obtained by an emulsion polymerization method and a production process for the same.

BACKGROUND ART

The size of a molecular weight of a polymer exerts a strong influence on the chemical properties and the physical properties of the polymer.

In general, as the molecular weight of a polymer grows larger, shown are tendencies such as an increase in the strength of the polymer, a reduction in blocking and an improvement in the weatherability. On the other hand, as the molecular weight of a polymer decreases, shown are tendencies such as an improvement in a heat-melting property, a heat fluidity, an adhesive property to various materials and a penetrability of the polymer and a gloss of the paint film formed.

Making use of these characteristics of polymers having a low molecular weight, the polymers having a low molecular weight are used in large quantities for molding resins having a good fluidity, electrophotographic toners, base materials for hot melt type coating agents, coating resin-modifying agents having good penetrability and wetting property against substrates, and tackifiers. Further, since the polymers having a low molecular weight have a good mixing property or dispersibility in various materials, they are useful for specific uses such as pigment dispersants, mineral dispersants, water-treating agents in boilers, cooling tower, reverse osmosis treatment, sugar refining, paper making, geothermal treatment, oil wells and the like, and detergent additives acting as builders, film-forming preventives, sequestering agents and adhesion-inhibiting agents.

Such polymers having a low molecular weight are obtained by polymerizing various monomers by methods such as bulk polymerization, solution polymerization, suspension polymerization, emulsion polymerization and the like, and they are produced preferably by emulsion polymerization because of the reasons that polymerization can easily be controlled and the resulting polymers are easy to handle.

Usually, when polymers having a low molecular weight are obtained by emulsion polymerization, the polymerization has so far been carried out in the coexistence of a chain transfer agent in order to reduce the molecular weight. In general, in this case, aliphatic mercaptan base and halogenated hydrocarbon base chain transfer agents are mainly used as chain transfer agents for industrial purposes.

However, a polymer dispersion obtained in the presence of mercaptans has undesired specific odor even if the remaining mercaptan content is small. When halogenated organic compounds (for example, carbon tetrachloride, bromoform, bromotrichloromethane and the like) are used as a chain transfer agent, the content of the chain transfer agent remaining in the polymer dispersion is relatively much remained, so that problems on air pollution and toxicity are brought about.

A principal object of the present invention is to produce a polymer of a low molecular weight having no or little odor by an emulsion polymerization method.

Intensive researches continued by the present inventors have resulted in finding that a polymer of a low molecular weight having no or little odor can readily be produced by emulsion-polymerizing a radical-polymerizable unsaturated monomer on a higher polymerization temperature condition than a polymerization temperature usually used for emulsion polymerization, and thus have come to complete the present invention.

DISCLOSURE OF INVENTION

Thus, the present invention provides a polymer obtained by emulsion-polymerizing a radical-polymerizable unsaturated monomer in the presence or absence of a chain transfer agent, wherein the above polymer has a weight average molecular weight falling in a range shown by the following equation (1):

$$3 \leq \log Mw < 1.50 - 1.18 \times \log(S+0.001) \quad (1)$$

wherein

Mw represents the weight average molecular weight of the polymer, and

S represents an equivalent number of a polyatomic radical part of the chain transfer agent bonded to the end of the polymer chain per 100 g of the polymer.

Further, the present invention provides a production process for a polymer, characterized by emulsion-polymerizing a radical-polymerizable unsaturated monomer at a temperature of 115° C. or higher in the presence or absence of a chain transfer agent, wherein the polymer has a weight average molecular weight falling in a range shown by the following equation (2):

$$3 \leq \log Mw < 4.11 - 0.93 \times \log(T+0.1) \quad (2)$$

wherein

Mw represents the weight average molecular weight of the resulting polymer, and

T represents parts by weight of the chain transfer agent used for the polymerization per 100 parts by weight of the unsaturated monomer.

The polymer and the production process according to the present invention shall be explained below in detail.

The polymer of the present invention is produced by emulsion polymerization in the absence of a chain transfer agent or the presence of a small amount, though used, of the chain transfer agent, and it is characterized by having a low molecular weight and a small content of chain transfer agent fragments introduced into the polymer as compared with those of polymers produced by conventional emulsion polymerization methods.

That is, the polymer of the present invention has a weight average molecular weight and a content of a polyatomic radical part of the chain transfer agent falling in a range in which a relation shown by the following inequality is set up between the weight average molecular weight (Mw) and an equivalent number (S; S=0 when the chain transfer agent is not used in emulsion polymerization) per 100 g of the polymer, of a polyatomic radical part (hereinafter referred to as a chain transfer agent fragment) of the remaining chain transfer agent bonded to the end of the polymer chain as a result of emulsion polymerization:

$$3 \leq \log Mw < 1.50 - 1.18 \times \log(S+0.001) \quad (1)$$

preferably $$3.18 \leq \log Mw < 1.24 - 1.18 \times \log (S+0.001) \quad (1\text{-}1)$$

and more preferably $$3.3 \leq \log Mw < 1.06 - 1.18 \times \log (S+0.001) \quad (1\text{-}2)$$

The chain transfer agent is split at a part where it is most easily cleaved in a chain transfer reaction and is turned into a monoatomic radical and a polyatomic radical which is composed of plural atoms, or two polyatomic radicals, wherein one of them is bonded to a polymer radical to terminate a chain propagation reaction, and the other becomes a starting point for a new chain propagation reaction to be bonded to a newly formed polymer. "S" used in the inequality described above is an equivalent number per 100 g of the polymer, of [a polyatomic radical] bonded to the polymer as a result of such reaction. In general, it falls preferably in a range of 0 to 0.05, particularly 0 to 0.015 and above all, 0 to 0.005.

For example, trichloromethane ($CHCl_3$) is cleaved at a part of C—H in emulsion polymerization into a monoatomic radical (H·) and a polyatomic radical ($CCl_3$·). When emulsion polymerization is carried out using as a chain transfer agent, mercaptans ($RCH_2SH$) or dimercaptans ($RCH_2S$—$SCH_2R'$), bromotrichloromethane ($CCl_3Br$) or carbon tetrachloride ($CCl_4$), or dichlorodibromomethane ($CCl_2Br_2$), polyatomic radical parts (chain transfer agent fragments) introduced into the chain terminals of the resulting polymer are [$RCH_2S$·], [$CCl_3$·] and [$CCl_2Br$·] respectively.

An amount of the chain transfer agent fragments bonded to the chain terminals of the polymer of the present invention can be determined in the following manner.

First, a polymer dispersion is allowed to stand overnight –20° C. to be frozen and then molten at a room temperature. Further, the polymer is separated by means of an ultracentrifuge. The separated polymer is dissolved or swollen in a good solvent such as toluene and then precipitated again in a poor solvent such as methanol or water and washed. In this case, it is to be confirmed that the polymer is not contained in the poor solvent.

The number of chain transfer agent fragments in the resulting polymer is determined by elemental analysis such as ion chromatography according to a combustion method or ICP (high frequency plasma emission analysis) or NMR (nuclear magnetic resonance analysis).

The polymer of the present invention having a weight average molecular weight and a content of chain transfer agent fragments satisfying the inequality described above is of a low molecular weight and has a small odor originating in the chain transfer agent, so that it can advantageously be used for the uses described above.

The polymer of the present invention has preferably a weight average molecular weight Mw falling in a range of 1000 to 100,000, a number average molecular weight Mn falling in a range of 500 to 35,000 and a molecular weight (molecular weight peak) Mp which shows a maximum value in a gel permeation chromatography (GPC) chart falling in a range of 500 to 80,000, more preferably a weight average molecular weight Mw falling in a range of 1,500 to 70,000, a number average molecular weight Mn falling in a range of 1,000 to 30,000 and a molecular weight peak Mp falling in a range of 1,000 to 50,000, and particularly preferably a weight average molecular weight Mw falling in a range of 2,000 to 50,000, a number average molecular weight Mn falling in a range of 1,000 to 25,000 and a molecular weight peak Mp falling in a range of 2,000 to 40,000.

In the present invention, the weight average molecular weight Mw, the number average molecular weight Mn and the molecular weight peak Mp can be determined by the following method.

First, 50 ml of the polymer dispersion is put in a beaker of 100 ml, and about 10 ml of about 1N diluted sulfuric acid is dropwise added to precipitate the polymer or separate and precipitate it by means of an ultracentrifuge. The polymer thus precipitated is filtered off and washed. Then, moisture on the surface is removed with a filter paper, and about 0.2 g thereof is weighed out and dissolved in about 50 ml of tetrahydrofuran (THF). Then, a solid content concentration of the resulting THF solution of the polymer is measured according to JIS K 6839. THF is further added to this solution to adjust the solid content to 0.2% by weight, and this is used as a sample to carry out gel permeation chromatography (GPC analysis). A high speed liquid chromatography apparatus [HCL-8020] (manufactured by Toso Co., Ltd.) is used for a measuring instrument, and the molecular weight is based on a polystyrene-converted value.

The polymer of the present invention includes, for example, polymers capable of being synthesized by radical polymerization, such as styrene base resins, (meth)acrylic base resins, fatty acid vinyl ester base resins, alkyl vinyl ether base resins and halogenated vinyl base resins. In particular, the styrene base resins and the (meth)acrylic base resins are preferred because various physical properties of the polymers are excellent.

The polymer of the present invention can be produced by emulsion-polymerizing a radical-polymerizable unsaturated monomer at a temperature of 115° C. or higher in the presence or absence of a chain transfer agent.

The radical-polymerizable unsaturated monomers capable of being emulsion-polymerized in the present invention shall not specifically be restricted as long as they are usually used for emulsion-polymerization. The following ones can be given as the examples thereof, and these monomers can be used alone or in combination of two or more kinds thereof.

Styrene base monomers: included are, for example, styrene, o-methylstyrene, m-methylstyrene, p-methylstyrene, α-methylstyrene, α-methylstyrene dimer (2,4-diphenyl-4-methyl-1-pentene), p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, 3,4-dichlorostyrene and p-chloromethylstyrene. Styrene is particularly preferred.

(Meth)acrylate base monomers: included are, for example, methyl acrylate, ethyl acrylate, n-butyl acrylate, i-butyl acrylate, propyl acrylate, n-octyl acrylate, dodecyl acrylate, lauryl acrylate, 2-ethtyl-hexyl acrylate, stearyl acrylate, 2-chloroethtyl acrylate, methyl α-chloroacrylate, methyl methacrylate, ethyl methacrylate, propyl methacrylate, n-butyl methacrylate, i-butyl methacrylate, n-octyl methacrylate, dodecyl methacrylate, lauryl methacrylate, 2-ethylhexyl methacrylate and stearyl methacrylate. Among them, (meth)-acrylates of $C_1$ to $C_{12}$, preferably $C_2$ to $C_8$ aliphatic alcohols can be used alone or in combination of two or more kinds thereof.

Aliphatic acid vinyl ester base monomers: for example, $C_1$ to $C_{12}$ saturated aliphatic acid vinyl monomers such as vinyl formate, vinyl acetate, vinyl propionate and vinyl versatate.

Alkyl vinyl ether base monomers: included are alkyl vinyl ethers such as, for example, methyl vinyl ether, ethyl vinyl ether, i-propyl vinyl ether, n-butyl vinyl ether, i-butyl vinyl ether, n-amyl vinyl ether, i-amyl vinyl ether, 2-ethylhexyl vinyl ether and octadecyl vinyl ether; and cycloalkyl vinyl ethers such as, for example, cyclohexyl vinyl ether, 2-methylcyclohexyl vinyl ether and 3,3,5-trimethylcyclohexyl vinyl ether.

Halogenated vinyl base monomers: included are halogenated vinyl base monomers such as, for example, vinyl chloride, vinylidene chloride, vinyl fluoride and vinylidene fluoride.

In addition to the monomers described above, monomers capable of being used for producing the polymer of the present invention include $C_1$ to $C_{12}$ dialkyl ester monomers of $C_4$ to $C_5$ unsaturated α, β-dicarboxylic acids such as, for example, dibutyl maleate, dioctyl maleate, dibutyl fumarate, dioctyl fumarate, dibutyl itaconate and dioctyl itaconate; and cyanized vinyl base monomers such as, for example, acrylonitrile and methacrylonitrile.

Further, there can also be used as monomers capable of constituting the polymer of the present invention, in addition to the various monomers described above, for example, monomers containing carboxyl groups, monomers containing hydroxyl groups, monomers containing amino groups or substituted amino groups, monomers containing amide groups or substituted amide groups, monomers containing nitrogen atoms other than amino groups or amide groups, monomers containing epoxy groups, monomers containing acetoacetyl groups, and silane base monomers.

The foregoing monomers containing carboxyl groups include unsaturated mono- or di-carboxylic acid monomers such as, for example, acrylic acid, methacrylic acid, maleic acid, maleic anhydride, fumaric acid, crotonic acid, itaconic acid, citraconic acid and cinnamic acid; unsaturated dicarboxylic acid monoalkyl ester monomers such as, for example, monobutyl maleate and mono-2-ethylhexyl fumarate; (meth)acrylates of dicarboxylic acid mono-polyhydric alcohol esters such as, for example, monohydroxyethyl succinate (meth)acrylate, monohydroxyethyl maleate (meth)acrylate, monohydroxyethyl fumarate (meth)acrylate, monohydroxyethyl phthalate (meth)acrylate and 1,2-dicarboxycyclohexane mono-hydroxyethyl (meth)acrylate; and for example, (meth)-acrylic acid dimer and ω-carboxy-polycaprolactone mono-(meth)acrylate.

The foregoing monomers containing hydroxyl groups include, for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 2-hydroxyethyl (meth)allyl ether, 2-hydroxypropyl (meth)allyl ether, 3-hydroxypropyl (meth)allyl ether, 4-hydroxybutyl (meth)allyl ether and allyl alcohol.

The foregoing monomers containing amino groups or substituted amino groups include, for example, aminoethyl (meth)acrylate, dimethylaminoethyl (meth)acrylate, diethylaminoethyl (meth)acrylate and butylaminoethyl (meth)acrylate.

The foregoing monomers containing amide groups or substituted amide groups include, for example, (meth)acrylamide, N-methylacrylamide, N,N-dimethylacrylamide, N-methylolacrylamide, N-methoxymethylacrylamide, N-butoxymethylacrylamide and N-dimethylaminopropylmethacrylamide.

The foregoing monomers containing nitrogen atoms other than amino groups or amide groups include, for example, monomers such as 2-vinylpyridine, 4-vinylpyridine, N-vinylpyrrolidone, N-vinylformamide and N-vinylimidazole.

The foregoing monomers containing epoxy groups include, for example, glycidyl (meth)acrylate, 3,4-epoxycyclohexylmethyl (meth)acrylate, glycidyl vinyl ether, 3,4-epoxycyclohexyl vinyl ether, glycidyl (meth)-allyl ether and 3,4-epoxycyclohexyl (meth)allyl ether.

The foregoing monomers containing acetoacetyl groups include alkenyl esters of vinyl acetoacetate such as, for example, vinyl acetoacetate and (meth)allyl acetoacetate; diesters of alkylene glycols with (meth)-acrylic acid and (substituted) acetoacetic acid such as, for example, 2-acetoacetoxyethyl (meth)acrylate, 2-acetoacetoxypropyl (meth)acrylate, 3-acetoacetoxypropyl (meth)acrylate, 2-acetoacetoxybutyl (meth)acrylate, 3-acetoacetoxybutyl (meth)acrylate and 4-cyanoacetoacetoxyethyl (meth)acrylate; diesters of alkylene glycols with crotonic acid and acetoacetic acid such as, for example, 2-acetoacetoxyethyl crotonate, 2-acetoacetoxypropyl crotonate and 3-acetoacetoxypropyl crotonate; and acetoacetates of N-alkylol (meth)acrylamide such as, for example, N-acetoacetoxymethyl (meth)acrylamide and N-acetoacetoxyethyl (meth)acrylamide.

Further, there can be used as the monomers described above, methacrylic acid acetoacetic acid diesters of lactone-modified hydroxyalkyl glycols obtained by esterifying lactone-modified hydroxyalkyl (meth)acrylates comprising adducts of hydroxyalkyl (meth)acrylates and lactones such as caprolactam with acetoacetic acid or acetoacetylating the above lactone-modified hydroxyalkyl (meth)acrylates with diketene.

The foregoing silane base monomers include, for example, 3-(meth)acryloxypropyltrimethoxysilane, 3-(meth)acryloxypropylmethyldimethoxysilane, 3-(meth)-acryloxypropyltriethoxysilane, 3-(meth)acryloxypropylmethyldiethoxysilane, 3-(meth)acryloxypropylethyldi-ethoxysilane, 3-crotonyloxypropyltrimethoxysilane, vinyltrimethoxysilane, vinyltriethoxysilane, vinyl tris(3-methoxyethoxy)silane, vinylmethyldimethoxysilane, vinylmethyldiethoxysilane, vinyidimethylmethoxysilane, vinyldimethylethoxysilane, vinyltriacetoxysilane, vinyltriisocyanatesilane, vinyltrichlorosilane, vinylmethyldichlorosilane, vinyldimethylchlorosilane, allyltrimethoxysilane and styrylethyltrimethoxysilane.

In addition to the radical-polymerizable unsaturated monomers described above, compounds having two or more polymerizable double bonds can be used in combination for the purpose of providing the low molecular weight polymers with a cross-linking structure to carry out emulsion polymerization. Such compounds having two or more polymerizable double bonds include, for example, aromatic divinyl compounds such as divinylbenzene and divinyinaphthalene; diethylenical carboxylic esters such as ethylene glycol dimethacrylate, tetraethylene glycol dimethacrylate, 1,3-butanediol dimethacrylate, 1,6-hexanediol diacrylate and aryl methacrylate; N,N-divinylaniline, divinyl ether, divinyl sulfide and triallyl cyanurate.

The emulsion polymerization in the present invention is carried out usually in the absence of the chain transfer agent but can be carried out as well, if necessary, in the presence of the chain transfer agent. Agents conventionally used for emulsion polymerization can be used likewise as the chain transfer agent capable of being used in such case and include, for example, sulfur-containing chain transfer agents such as n-dodecylmercaptan, t-dodecylmercaptan, n-butylmercaptan, 2-ethylhexyl thioglycolate and 2-mercaptoethanol; halogen-containing chain transfer agents such as trichlorobromomethane, carbon tetrachloride and bromoform; nitrogen-containing chain transfer agents such as N,N-di-methyl-formamide and pivalonitrile; in addition thereto, turbinolene, myrcel, limonene, α-pinene and β-pinene.

The chain transfer agent can usually be used according to a weight average molecular weight (Mw) desired to the resulting polymer in an amount (T represents parts by weight of the chain transfer agent used for the polymerization per 100 parts by weight of the radical-polymerizable unsaturated monomer, and when the chain transfer agent is not used, T is zero) falling in a range in which a relation shown by the following inequality is set up:

$$3 \leq \log Mw < 4.11 - 0.93 \times \log (T+0.1) \quad (2)$$

preferably $$3.18 \leq \log Mw < 3.85 - 0.93 \times \log (T+0.1) \quad (2\text{-}1)$$

more preferably $$3.3 \leq \log Mw < 3.67 - 0.93 \times \log (T+0.1) \quad (2\text{-}2)$$

To be more specific, the use amount (T) of the chain transfer agent falls preferably in a range of:

$$0 \leq T \leq 3$$

particularly $$0 \leq T \leq 1$$

above all $$0 \leq T \leq 0.1$$

According to the present invention, the polymer having a low molecular weight which is equivalent to or lower than those of polymers obtained by emulsion polymerization using conventional chain transfer agents can be produced by using much smaller amounts of the chain transfer agents, and even when the chain transfer agents are used, the use amounts thereof can be reduced to a large extent.

The emulsion polymerization in the present invention is characterized by being carried out at higher temperatures which have not so far been used. In the present invention, the emulsion polymerization is carried out at a temperature falling in a range of 115° C. or higher, preferably 120 to 250° C., more preferably 130 to 200° C. and particularly preferably 140 to 190° C. When the polymerization temperature is lower than 115° C., it is difficult to obtain the polymer having a low molecular weight which is intended in the present invention.

Thus, since a high polymerization temperature is used in the present invention, the emulsion polymerization is preferably carried out usually under pressure at which the reaction mixture is not vaporized and volatilized. In general, the polymerization is carried out preferably under a pressure (gauge pressure) of about 1 to about 50 kg/cm$^2$, preferably about 1 to 10 kg/cm$^2$. To be specific, for example, a pressure proof polymerization vessel is used, and the reaction can be carried out in a sealed state while controlling the pressure.

The emulsion polymerization in the present invention can be carried out by polymerizing the radical-polymerizable monomers described above in an aqueous medium in the presence of the chain transfer agent on the polymerization temperature condition described above using an emulsifier, an initiator and the like.

Usually, deionized water is used as the polymerization medium, but a mixed solvent of a water miscible organic solvent such as alcohol and water can be used in a certain case. The reaction can be carried out in the air but may be carried out, if necessary, under an atmosphere of inert gas such as nitrogen and argon.

The emulsifier capable of being used in the emulsion polymerization may be any of anionic emulsifiers, nonionic emulsifiers, cationic emulsifiers and amphoteric emulsifiers, and these emulsifiers may be used alone or can be used in combination of two or more kinds thereof.

Examples of the nonionic emulsifiers described above include polyoxyethylene alkyl ethers such as, for example, polyoxyethylene lauryl ether and polyoxyethylene stearyl ether; polyoxyethylene alkylphenyl ethers such as, for example, polyoxyethylene octylphenyl ether and polyoxyethylene nonylphenyl ether; sorbitan higher fatty acid esters such as, for example, sorbitan monolaurate, sorbitan monostearate and sorbitan trioleate; polyoxyethylene sorbitan higher fatty acid esters such as, for example, polyoxyethylene sorbitan monolaurate; polyoxyethylene higher fatty acid esters such as, for example, polyoxyethylene monolaurate and polyoxyethylene monostearate; glycerin higher fatty acid esters such as, for example, monoglyceride oleate and monoglyceride stearate; in addition thereto, polyoxyethylene.polyoxypropylene.block copolymers.

Examples of the anionic emulsifiers described above include higher fatty acid salts such as, for example, sodium oleate; alkylarylsulfonic acid salts such as, for example, sodium dodecylbenzenesulfonate; alkylsulfuric acid salts such as, for example, sodium laurylsulfate; polyoxyethylene alkyl ethersulfuric ester salts such as, for example, sodium polyoxyethylene lauryl ethersulfate; polyoxyethylene alkylaryl ethersulfuric ester salts such as, for example, sodium polyoxyethylene nonylphenyl ethersulfate; and alkylsulfosuccinic ester salts and derivatives thereof such as sodium monooctylsulfosuccinate, sodium dioctylsulfosuccinate and sodium polyoxyethylene laurylsulfosuccinate.

The amphoteric emulsifiers described above include, for example, alkyl betaines such as lauryl betaine.

Further, fluorine base emulsifiers obtained by substituting at least a part of hydrogen atoms of the alkyl groups of these emulsifiers with fluorine can be used as well.

Examples of the cationic emulsifiers described above include octadecyltrimethylammonium chloride, dodecyltrimethylammonium chloride, hexadecyltrimethylammonium chloride, dioctadecyidimethylammonium chloride, didodecyldimethylammonium chloride, dodecylbenzyidimethylammonium chloride, tetradecylbenzyldimethylammonium chloride, octadecylbenzyldimethylammonium chloride, tetradecyltrimethylammonium chloride, dihexadecyidimethylammonium chloride, dioctadecyldimethylammonium chloride, hexadecylbenzyldimethylammonium chloride, palmityltrimethylammonium chloride, oleyltrimethylammonium chloride, dipalmitylbenzyltrimethylammonium chloride and dioleylbenzyltrimethylammonium chloride.

Further, there can be used cationic emulsifiers using as starting materials, natural vegetable oils such as coconut oil, palm oil, safflower oil, cotton seed oil, rape seed oil and linseed oil, and these cationic emulsifiers include coconut oil alkylbenzyldimethylammonium chloride and coconut oil alkyltrimethylammonium chloride. Amine acetates and hydrochlorides include dodecylamine acetate, tetradodecylamine acetate, octadecylamine acetate, dodecylamine acetate, tetradodecylamine hydrochloride, octadecylamine hydrochloride and hardened beef tallow amine acetate.

Further, reactive emulsifiers having polymerizable double bonds in molecular structures can be used as well, and examples of these reactive emulsifiers include a reactive emulsifier represented by the following formula (1) or (2):

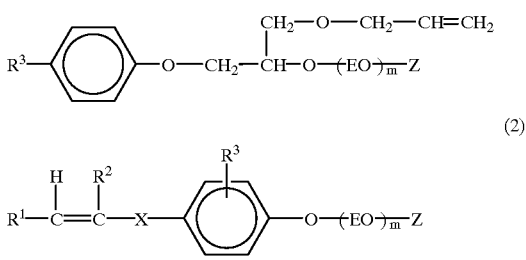

wherein $R^1$ and $R^2$ represent independently hydrogen or a methyl group; $R^3$ represents an alkyl group having 6 to 18 carbon atoms, an alkenyl group, an aryl group or an aralkyl group; EO is —CH$_2$CH$_2$O—; X represents a single bond or a methylene group; Z represents hydrogen or SO$_3$M, in which M represents alkaline metal, ammonium or organic ammonium; and m is a natural number of 1 to 50.

Among the reactive emulsifiers represented by the formula (1) described above, specific examples of the anionic reactive emulsifiers in which Z is SO$_3$M include, for example, [Adeka Reasoap SE-10N] (manufactured by Asahi Denka Ind. Co., Ltd.), and specific examples of the anionic reactive emulsifiers in which Z is hydrogen include, for example, [Adeka Reasoap NE-10], [Adeka Reasoap NE-20] and [Adeka Reasoap NE-30] (all manufactured by Asahi Denka Ind. Co., Ltd.).

Among the reactive emulsifiers represented by the formula (2) described above, specific examples of the anionic reactive emulsifiers in which Z is SO$_3$M include, for example, [Aquaron HS-10] and [Aquaron HS-20] (all manufactured by Daiichi Kogyo Seiyaku Co., Ltd.), and specific examples of the nonionic reactive emulsifiers in which Z is hydrogen include, for example, [Aquaron RN-10], [Aquaron RN-20], [Aquaron RN-30] and [Aquaron RN-50] (all manufactured by Daiichi Kogyo Seiyaku Co., Ltd.).

Anionic reactive emulsifiers other than those described above include alkylsulfosuccinic acid alkenyl ether salt base reactive emulsifiers such as, for example, [Latemul S-120], [Latemul S-120A], [Latemul S-180] and [Latemul S-180A] (all manufactured by Kao Corp.); alkylsulfosuccinic acid alkenyl ester salt base reactive emulsifiers such as, for example, [Eleminol JS-2] (manufactured by Sanyo Kasei Ind. Co., Ltd.); methylenebispolyoxyethylene alkylphenylalkenyl ether sulfuric acid ester salt base reactive emulsifiers such as, for example, [Antox MS-60] (manufactured by Nippon Nyukazai Co., Ltd.); alkylalkenylsulfosuccinic acid ester salt base reactive emulsifiers such as, for example, [Latemul ASK] (manufactured by Kao Corp.); polyoxyalkylene (meth)-acrylate sulfuric acid ester salt base reactive emulsifiers such as, for example, [Eleminol RS-30] (manufactured by Sanyo Kasei Ind. Co., Ltd.); polyoxyalkylene alkyl ether aliphatic unsaturated dicarboxylic acid ester salt base reactive emulsifiers such as, for example, [RA-1120] and [RA-2614] (all manufactured by Nippon Nyukazai Co., Ltd.); (meth)acrylic acid sulfoalkyl ester salt base reactive emulsifiers such as, for example, [Antox MS-2N] (manufactured by Nippon Nyukazai Go., Ltd.); phthalic acid dihydroxyalkyl (meth)acrylate sulfuric acid ester salt base reactive emulsifiers; and mono- or di(glycerol-1-alkylphenyl-3-allyl-2-polyoxyalky lene ether)phosphoric acid ester salt base reactive emulsifiers such as, for example, [H-3330PL] (manufactured by Daiichi Kogyo Seiyaku Co., Ltd.).

Nonionic reactive emulsifiers other than those described above include polyoxyalkylene alkylphenyl ether (meth) acrylate base reactive emulsifiers such as, for example, [RMA-564] and [RMA-568] (all manufactured by Nippon Nyukazai Co., Ltd.); and polyoxyalkylene alkylphenyl ether (meth)acrylate base reactive emulsifiers such as, for example, [RMA-1114] (manufactured by Nippon Nyukazai Co., Ltd.).

Water soluble protective colloid can be used in combination with the anionic and/or nonionic emulsifiers described above.

The water soluble protective colloid capable of being used includes polyvinyl alcohols such as, for example, partially saponified polyvinyl alcohol, fully saponified polyvinyl alcohol and modified polyvinyl alcohol; cellulose derivatives such as, for example, hydroxyethyl cellulose, hydroxypropyl cellulose and carboxymethyl cellulose; and natural polysaccharides such as gua gum. They can be used in a mode of single use or combined use of plural kinds.

The use amount of the emulsifiers described above can be set usually in a range of 0.03 to 10 parts by weight, preferably 0.05 to 7 parts by weight and more preferably 0.1 to 5 parts by weight per 100 parts by weight of the total of the monomers to be used.

Further, optional water soluble initiators which have so far been used for emulsion polymerization can be used likewise as the initiator capable of being used for emulsion polymerization in the present invention.

A group of suitable initiators are free radical initiators such as hydrogen peroxide, some specific alkyl hydroperoxides, dialkyl peroxides, persulfates, peresters, percarbonates, ketone peroxides and azo initiators. Specific examples of the suitable free radical initiators include hydrogen peroxide, t-butyl hydroperoxide, di-tert-butyl peroxide, ammonium persulfate, potassium persulfate, sodium persulfate, tert-amyl hydroperoxide, methyl ethyl ketone peroxide, 2,2'-azobis(2-amidinopropane) and 2,2'-azobis(4-cyanovaleric acid). From the viewpoint that the water resistance of the polymer is not reduced, preferred are nonionic catalysts such as hydrogen peroxide, alkyl hydroperoxides, dialkyl peroxides, peresters, percarbonates, ketone peroxides and azo initiators, and hydrogen peroxide is particularly preferred.

In general, the use amount of such free radical initiator falls preferably in a range of 0.05 to 50 parts by weight, more preferably 0.2 to 30 parts by weight and particularly preferably 1 to 10 parts by weight per 100 parts by weight of the total of the monomers used. The reaction temperature and the use amount of the free radical initiator are controlled according to the molecular weight desired to the intended polymer.

A water soluble redox initiator obtained by combining a water soluble peroxide with a water soluble reducing agent can be used as well. The peroxide used for the water soluble redox initiator includes the peroxides described above, and there can be used as the reducing agent, for example, sodium bisulfite, sodium pyrosulfite, sodium sulfite, hypophosphites, ascorbic acid and formaldehyde-sodium sulfoxylate.

In general, the use amount of the reducing agent in the redox catalyst can fall in a range of 0.05 to 50 parts by weight per 100 parts by weight of the total of the monomers used.

Further, in addition to the redox catalysts described above, a trace amount of transition metal, for example, ferrous sulfate and Mohr's salt copper sulfate can be used in combination.

The radical-polymerizable unsaturated monomer, the chain transfer agent, the emulsifier, the initiator and the aqueous medium each described above can be added gradually to a polymerization vessel in one lot to be reacted, or at first, a part of them is added and heated to start polymerization, and then the remainder can be added to carry out the polymerization. In general, the latter method is preferred from the viewpoint that the polymerization temperature can readily be controlled. Further, the radical-polymerizable unsaturated monomer is mixed in advance with the emulsifier and the aqueous medium to prepare an emulsion of the monomer, and this emulsion is added to the polymerization vessel to carry out polymerization, whereby the emulsion polymerization can safely be advanced.

Further, the emulsion polymerization can be carried out by a so-called power feed polymerization method in which polymerization is carried out while changing the composition of monomers and a so-called seed polymerization method in which a polymer emulsion is added in advance and then polymerization is started.

Further, the initiator may be added at first in one lot, or first a small amount, for example, 0.1 to 2 parts by weight, preferably 0.5 to 1 part by weight per 100 parts by weight of the total of the monomer is added, and then the remainder may be added intermittently, semi-continuously or continuously after starting the polymerization. The addition thereof can be finished usually in 5 minutes to 5 hours, preferably 30 minutes to 4 hours and more preferably 1 to 3 hours.

The emulsion polymerization described above turns usually a great part of the monomer fed into a polymer and allows the unreacted monomer to scarcely remain. However, if it is desired to further reduce the content of the residual monomer, the residual monomer can be reduced by a method in which the initiator is added to the reaction mixture after the polymerization to further promote the polymerization of the residual monomer or nitrogen or air is blown to thereby remove the residual monomer.

Thus, an emulsified dispersion containing a polymer having a low molecular weight is obtained. Polymer particles contained in the above emulsified dispersion can have usually a particle diameter falling in a range of 0.01 to 2 $\mu$m, preferably 0.02 to 1 $\mu$m and more preferably 0.05 to 0.5 $\mu$m. The polymer contained in the above emulsified dispersion has a concentration (solid matter concentration) falling usually in a range of 20 to 80% by weight, preferably 30 to 70% by weight and more preferably 40 to 65% by weight, and the viscosity (BH type rotary viscometer, 25° C., 20 rpm; herein-after the same viscosity measuring conditions apply) falls usually in a range of 10,000 cps or less, particularly 5 to 5,000 cps.

Further, the polymer-emulsified dispersion has a pH falling usually in a range of 2 to 10, particularly preferably 2 to 9, and the pH of the dispersion may be adjusted, if necessary, by adding aqueous ammonia, an amine aqueous solution and an alkali hydroxide aqueous solution.

There can further be added to and mixed with the polymer-emulsified dispersion, if necessary, defoaming agents such as silicon base compounds; thickeners and viscosity-improving agents such as polycarboxylic acid base resins and surfactants; film-forming aids such as ethylene glycol, butyl cellosolve, butyl carbitol, butyl carbitol acetate and 2,2,4-trimethyl-1,3-pentanediol monoisobutyrate; anti-oxidants; preservatives; fungicides; UV-absorbers; and anti-static agents.

The resulting polymer-emulsified dispersion can be used as it is in a dispersion state according to uses thereof, or the polymer separated from the above dispersion can be used.

The polymer can be separated from the dispersion, for example, by putting the polymer-emulsified dispersion directly into a flash dryer or a spray dryer to dry it or adding an electrolyte to salt out the polymer or adding a solvent such as alcohol to precipitate the polymer by solvation and then centrifuging and drying it.

The polymer-emulsified dispersion obtained according to the present invention can advantageously be used as it is for a thermoplastic or thermosetting coating composition (for example, paint and adhesive). Further, the above composition can be blended, if necessary, with conventional polymers, cross-linking agents or modifiers to thereby obtain, for example, a polymer composition with a wide molecular weight distribution containing the low molecular weight polymer obtained by the emulsion polymerization in the present invention and a polymer having a high molecular weight, a polymer composition having plural molecular weight peaks and a polymer composition in which polymers having different compositions are blended. The use of such composition can improve the properties of the film such as, for example, appearance, gloss, build feeling, water resistance, alkali resistance, acid resistance, solvent resistance, weatherability, strength and the like. Blending may be carried out by dissolving or dispersing the additives described above in the polymerizable monomers before emulsion polymerization or by blending them in the form of a suitable aqueous dispersion in the middle or after the emulsion polymerization. Specific examples and use amounts of such additives are as follows:

(1) Cellulose derivatives (for example, cellulose acetate butyrate, cellulose acetate propionate and nitrocellulose): they can provide the film with excellent properties such as gloss, a color and a gloss-holding property, weatherability, heat stability, a heat flow property and hardness, and the use amount thereof can fall in a range of 5 to 50 parts by weight per 100 parts by weight of the polymer.

(2) Acryl resin and alkyd resin: used usually in an amount of 150 parts by weight or less per 100 parts by weight of the polymer.

(3) Cross-linking agents such as aminoplast resin, blocked polyisocyanate compounds, compounds having two or more carboxyl groups or acid anhydrides thereof and epoxy compounds:

Such cross-liking agents can contribute to an improvement in appearance, gloss and physical and chemical properties of the film. The aminoplast resin described above includes condensation products of amino compounds such as urea, melamine and guanamines with formaldehyde, and alcohol-etherified compounds thereof.

They can be used in a range of 5 to 40 parts by weight per 100 parts by weight of the polymer, and the baking temperature falls preferably in a range of 80 to 200° C. The blocked polyisocyanate compounds described above include, for example, addition products of diisocyanates or polyisocyanates and blocking agents (phenols, alcohols, lactams, active methylene compounds, amines and oximes), and they can be used in a range of 5 to 60 parts by weight per 100 parts by weight of the polymer. In using this blocked polyisocyanate, dissociation catalysts such as bases (triethylamine, N-methylmorpholine and the like) and metal compounds (dibutyltin dilaurate, stannous chloride and the like) are preferably used in combination. The baking temperature falls suitably in a range of 120 to 220° C.

The foregoing compounds having two or more carboxyl groups or acid anhydrides thereof include, for example, polycarboxylic acids (adipic acid, sebacic acid, phthalic acid, trimellitic acid and the like) and acid anhydrides thereof (phthalic anhydride, trimellitic anhydride, polyester resins obtained by condensation reaction of excess polycarboxylic acids with polyols, and the like), and they can be used in a range of 3 to 50 parts by weight per 100 parts by weight of the polymer. The baking temperature falls suitably in a range of 120 to 220° C.

The epoxy compounds described above include, for example, copolymers of triglycidyl isocyanurate, glycidyl acrylate, glycidyl methacrylate, methylglycidyl acrylate, methylglycidyl methacrylate and the like with other copolymerizable monomers, a condensation product of bisphenol A and epichlorohydrin, a condensation product of novolak and epichlorohydrin, diepoxy compounds having a polyalkyl ether chain structure, alicyclic epoxy compounds and the like. They can be used in a range of 5 to 40 parts by weight per 100 parts by weight of the polymer. In use, there may be used in combination, if necessary, hardening-accelerating catalysts such as Lewis acids (boron trifluoride and the like), bases (benzyldimethylamine, 2-ethyl-5-methylimidazole, triethyleneamine, N-methylmorpholine and the like) and salts (boron trifluoride-monoethylamine complex salt and the like). The baking temperature falls suitably in a range of 140 to 220° C.

(4) Other ester gums, maleic acid resins and phenol resins.

A coating composition obtained by using the polymer-emulsified emulsion of the present invention can be colored with organic pigments (for example, phthalocyanine blue and phthalocyanine green) and inorganic pigments (for example, carbon black, titanium oxide and aluminum flake) usually used for coloring paints. Such pigments can be added to water or the polymerizable monomers in the emulsion polymerization. Further, the above coating composition can be blended as well with additives such as conventional wetting agents, film surface-controlling agents, curing aids and antioxidants.

The polymer of the present invention can be used, for example, as a toner binder for an electronic copying machine, a binder resin for paints, a tackifier, a sealant, a plasticizer, a pigment dispersant, various treating agents and the like.

When the polymer of the present invention is used as the toner binder for an electronic copying machine, the kind of the polymer is preferably a styrene resin or an epoxy resin. The toner for an electronic copying machine does not have to cause blocking between the toners during storage. On the other hand, the toner transferred on paper is requested to be quickly fixed on the paper in the course of fixation. A toner comprises particles which are present in the form of a homogeneous mixture of carbon black, a binder resin, an anti-static agent and the like, and if the binder resin is soft, the toners are liable to cause blocking between them but have a good fixing property. In contrast with this, if the binder resin is hard, blocking is hardly brought about but the fixing property is inferior. In order to satisfy these required characteristics which are contrary to each other, a resin-mixed composition obtained by mixing a resin having a high molecular weight with a resin having a low molecular weight is usually used as a resin for a toner binder in many cases. The polymer of the present invention is particularly useful as a resin component of a low molecular weight in such resin mixed composition and can be used in combination with a resin having a high molecular weight obtained by suspension polymerization and emulsion polymerization.

Further, the polymer of the present invention can be turned into a paint composition by blending with various pigments and the like. A paint containing the polymer of the present invention provides a paint film having good gloss and adhesive property. A functional group such as carboxyl group and a hydroxyl group can be introduced into the polymer of the present invention used for a paint, and making use of this functional group, the polymer is cross-linked with a curing agent such as an isocyanate compound and melamine, whereby the paint film which is excellent in a water resistance and a mechanical strength can be formed. The kind of the polymer used for a paint shall not specifically be restricted, and in general, styrene base polymers or acryl base polymers are preferred. Further, the polymer of the present invention produced using a monomer having a carboxyl group such as acrylic acid and methacrylic acid in a proportion of 30% by weight or more based on the whole monomers can be solubilized in water by neutralizing with, for example, organic amine and can be used for water base paints. Further, the paint film performances such as an adhesive property and gloss can be raised as well by adding a hydrophobic polymer such as polystyrene produced by the method of the present invention in a proportion of 5 to 30% by weight as an additive to a paint.

The polymer of the present invention having a weight average molecular weight falling in a range of 1000 to 10000 can be used as a plasticizer, a dispersant and various treating agents.

The polystyrene base resin obtained by the method of the present invention is excellent in not only affinity with pigments but also compatibility with resins and therefore can be used as a master batch for coloring a styrene resin and polyvinyl chloride.

EXAMPLES

The present invention shall more specifically be explained below with reference to examples and comparative examples.

Example 1

First, a vessel equipped with a dropping pump was charged with 31 parts by weight of deionized water and 5 parts by weight of an anionic reactive emulsifier [Aquaron HS-10] [sodium polyoxyethylene (n=about 10) nonylpropenylphenyl ethersulfate; effective ingredient about 100% by weight; manufactured by Asahi Denka Ind. Co., Ltd.] and stirred to dissolve them. Then, a monomer mixed solution comprising 42.7 parts by weight of methyl methacrylate (MMA), 52.3 parts by weight of 2-ethylhexyl acrylate (EHA) and 5 parts by weight of acrylic acid (AA) was dropwise added under stirring to obtain a monomer emulsion.

Next, a pressure proof reactor equipped with a stirrer, a pressure gauge, a thermometer and a dropping pump was charged with 120 parts by weight of deionized water and substituted with nitrogen. Then, it was heated to 150° C. after sealing, and 10% by weight of the monomer emulsion described above was added to the pressure proof reactor. Further, 3 parts by weight of a 5 weight % hydrogen peroxide aqueous solution was added to carry out initial polymerization at 150° C. After finishing the initial polymerization, the temperature was elevated to 155° C., and the remaining monomer emulsion and 19 parts by weight of the 5 weight % hydrogen peroxide aqueous solution were added in 3 hours. Thereafter, the same temperature was maintained for 2 hours to obtain an aqueous acryl base polymer dispersion. The polymer dispersion thus obtained had a high polymerization conversion rate and could stably be polymerized.

The polymer dispersion was analyzed after separating by means of an ultra centrifuge, and as a result thereof, it had a weight average molecular weight (Mw) of 39,000, a number average molecular weight (Mn) of 14,000, a molecular weight peak (Mp) of 33,000 and Mw/Mn of 2.8. Also, it had a very little odor.

Example 2

A vessel equipped with a dropping pump was charged with 31 parts by weight of deionized water, 2.5 parts by weight of [Neogen R] and 0.8 part by weight of [STK-199] [polyoxyethylene (n=about 30) nonylphenyl ether; effective ingredient about 70% by weight; manufactured by Kao Corp.] and stirred to dissolve them. Then, a monomer mixed solution comprising 95 parts by weight of styrene and 5 parts by weight of 2-hydroxyethyl acrylate was dropwise added while stirring to obtain a monomer emulsion.

The same reactor as used in Example 1 was charged with 120 parts by weight of deionized water and 0.3 part by weight of an anionic emulsifier [Neogen R] [sodium alkylbenzenesulfonate; effective ingredient about 60% by weight; manufactured by Daiichi Kogyo Ind. Co., Ltd.] and substituted with nitrogen. Then, it was heated to 185° C. after sealing.

Added to the pressure proof reactor was 5 parts by weight of a 5 weight % hydrogen peroxide aqueous solution, and then the monomer emulsion described above and 75 parts by weight of the 5 weight % hydrogen peroxide aqueous solution were added at 185° C. in 3 hours. Thereafter, the same temperature was maintained for 2 hours to obtain an aqueous styrene polymer.

The polymer was analyzed in the same manner as in Example 1, and as a result thereof, it had a weight average molecular weight (Mw) of 3,400, a number average molecular weight (Mn) of 1,500, a molecular weight peak (Mp) of 3,000 and Mw/Mn of 2.3. Also, it had a very little odor.

Example 3

The same operation as in Example 2 was carried out, except that 52 parts by weight of styrene, 15 parts by weight of methyl methacrylate, 30 parts by weight of butyl acrylate and 3 parts by weight of acrylic acid were used as monomers and the 5 weight % hydrogen peroxide aqueous solution was changed in an amount from 75 parts by weight to 95 parts by weight and that the reaction temperature was changed from 185° C. to 145° C. The polymer thus obtained was analyzed, and as a result thereof, it had a weight average molecular weight (Mw) of 12,500, a number average molecular weight (Mn) of 5,200, a molecular weight peak (Mp) of 11,000 and Mw/Mn of 2.4.

Example 4

The same operation as in Example 3 was carried out, except that 25 parts by weight of a 2.5 weight % potassium persulfate aqueous solution was substituted for 75 parts by weight of the 5 weight % hydrogen peroxide aqueous solution and that the reaction temperature was changed to 160° C.

The polymer thus obtained was analyzed, and as a result thereof, it had a molecular weight peak (Mp) of 21,000, a weight average molecular weight (Mw) of 25,000, a number average molecular weight (Mn) of 9,300 and Mw/Mn of 2.7. Also, the odor was scarcely present.

Comparative Example 1

A polymer was synthesized on the same conditions as in Example 4, except that the reaction temperature was changed to 90° C.

The polymer thus obtained was analyzed, and as a result thereof, it had a molecular weight peak (Mp) of 270,000 and a weight average molecular weight (Mw) of 340,000.

Example 5

The same operation as in Example 2 was carried out, except that 0.3 part by weight of bromotrichloromethane as a chain transfer agent was added to 95 parts by weight of styrene and 5 parts by weight of 2-hydroxyethyl acrylate and the 5 weight % hydrogen peroxide aqueous solution was changed in an amount from 75 parts by weight to 15 parts by weight and that the reaction temperature was changed from 185° C. to 160° C.

The polymer thus obtained was analyzed, and as a result thereof, it had a weight average molecular weight (Mw) of 7,000, a number average molecular weight (Mn) of 2,800, a molecular weight peak (Mp) of 6,100 and Mw/Mn of 2.5. Also, the odor was very small. The polymerization conversion rate was high, and the polymerization could stably be carried out.

After separating, the resulting polymer was washed with methanol to be refined and dried, and then an equivalent number S of chain transfer agent fragments originating in bromotrichloromethane bonded to the end of the polymer chain was determined by ion chromatography according to a combustion method, and as a result thereof, the value of S was 0.00212 (equivalent/100 g of the polymer).

Comparative Example 2

The same operation as in Example 5 was carried out, except that the chain transfer agent was changed to 7 parts by weight of bromotrichloromethane and vitamin C was added as a reducing agent for hydrogen peroxide at the same time in the same amount as that of hydrogen peroxide and that the reaction temperature was changed from 160° C. to 90° C.

The polymer thus obtained was analyzed, and as a result thereof, it had a weight average molecular weight (Mw) of 7,200, a number average molecular weight (Mn) of 2,600, a molecular weight peak (Mp) of 6,100 and Mw/Mn of 2.8. The polymerization conversion rate was low, and the odor containing halogen was very strong. Further, block matters were produced during the polymerization, and the polymer was adhered to the polymerization vessel and lacking in polymerization stability.

After separating, the resulting polymer was washed with methanol to be refined and dried, and then an equivalent number S of chain transfer agent fragments originating in bromotrichloromethane used was determined by ion chromatography, and as a result thereof, the value of S was 0.0346 (equivalent/100 g of the polymer).

What is claimed is:

1. A polymer obtained by emulsion-polymerizing a radical-polymerizable unsaturated monomer at a temperature of at least 115° C., in the presence or absence of a chain transfer agent, wherein said polymer has a weight average molecular weight falling in a range shown by the following equation:

$$3 \leq \log Mw < 1.50 - 1.18 \times \log(S + 0.001)$$

wherein

Mw represents the weight average molecular weight of the polymer, and

S represents an equivalent number of a polyatomic radical part of the chain transfer agent bonded to the end of the polymer chain per 100 g of the polymer.

2. The polymer according to claim 1, wherein the polymer has a weight average molecular weight falling in a range shown by the following equation:

$$3.18 \leq \log M_w < 1.24 - 1.18 \times \log(S + 0.001)$$

wherein Mw and S are defined above.

3. The polymer according to claim 1, wherein the value of S falls in a range of 0 to 0.05.

4. The polymer according to claim 1, wherein the polymer has a weight average molecular weight falling in a range of 1000 to 100,000.

5. The polymer according to claim 1, wherein the polymer is a styrene base resin or a (meth)acrylic base resin.

6. A process for producing a low-molecular weight emulsion-polymer which comprises emulsion-polymerizing a radical-polymerizable unsaturated monomer at a temperature of at least 115° C., in the presence or absence of a chain transfer agent, whereby said polymer has a weight average molecular weight falling in a range shown by the following equation:

$$3 \leq \log M_w < 4.11 - 0.93 \times \log(T + 0.1)$$

wherein

Mw represents the weight average molecular weight of the resulting polymer, and

T represents parts by weight of the chain transfer agent used for the polymerization per 100 parts of the unsaturated monomer.

7. The process according to claim 6, wherein the emulsion polymerization is carried out at a temperature of 120 to 250° C.

8. The process according to claim 6, wherein the emulsion polymerization is carried out at a temperature of 140 to 190° C.

9. The process according to claim 6, wherein the value of T falls in a range of 0 to 3.

10. The process according to claim 6, wherein the emulsion polymerization is carried out in the absence of the chain transfer agent.

11. The process according to claim 6, wherein the radical-polymerizable unsaturated monomer is at least one monomer selected from the group consisting of a styrene base monomer and a (meth)acrylate base monomer.

12. An emulsified dispersion containing the polymer as described in claim 1.

13. The polymer according to claim 1, wherein the value of S is in the range of from 0 to 0.015.

14. The polymer according to claim 1, wherein the value of S is in the range of from 0 to 0.005.

15. The polymer according to claim 1, wherein S=0.

16. The polymer according to claim 1, having a weight average molecular weight, Mw, of from 2,000 to 50,000, a number average molecular weight, Mn, of from 1,000 to 25,000 and a molecular weight peak, Mp, of from 2,000 to 40,000.

* * * * *